2 Sheets—Sheet 1.
G. F. S. ZIMMERMAN.
GRAIN THRESHER AND CLEANER.
No. 9,579. Patented Feb. 8, 1853.
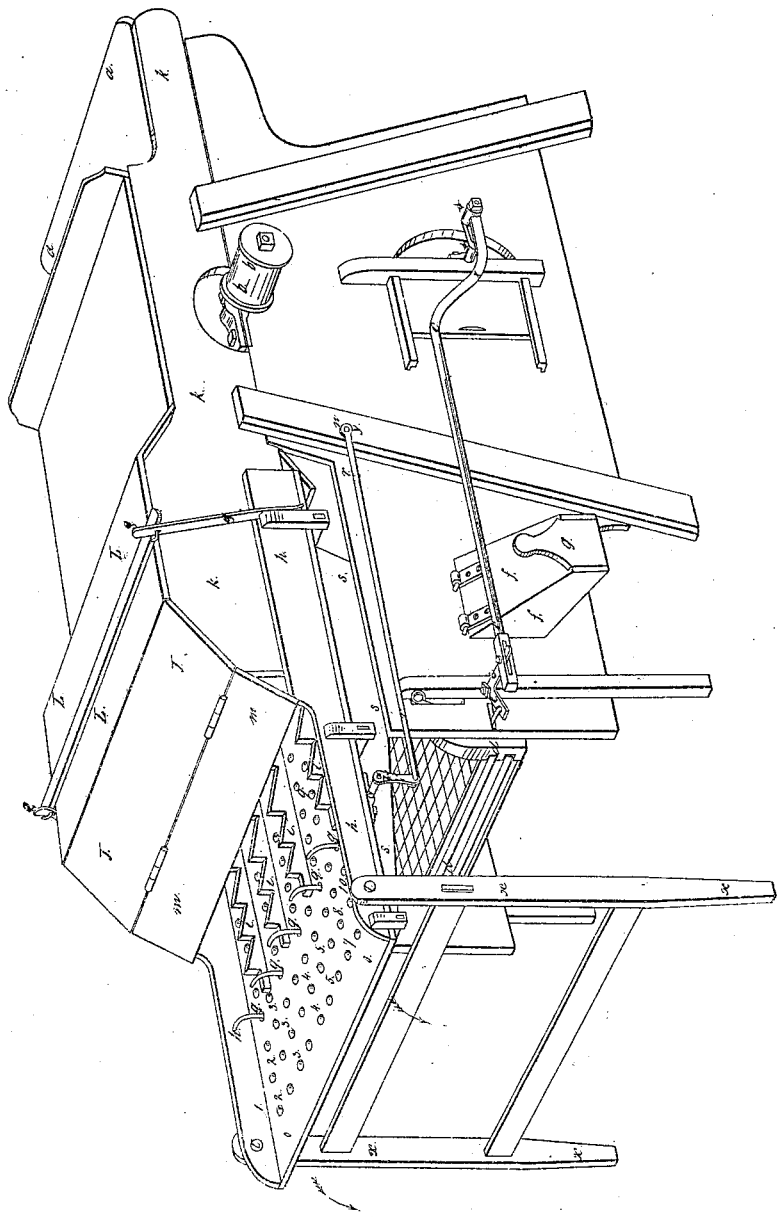

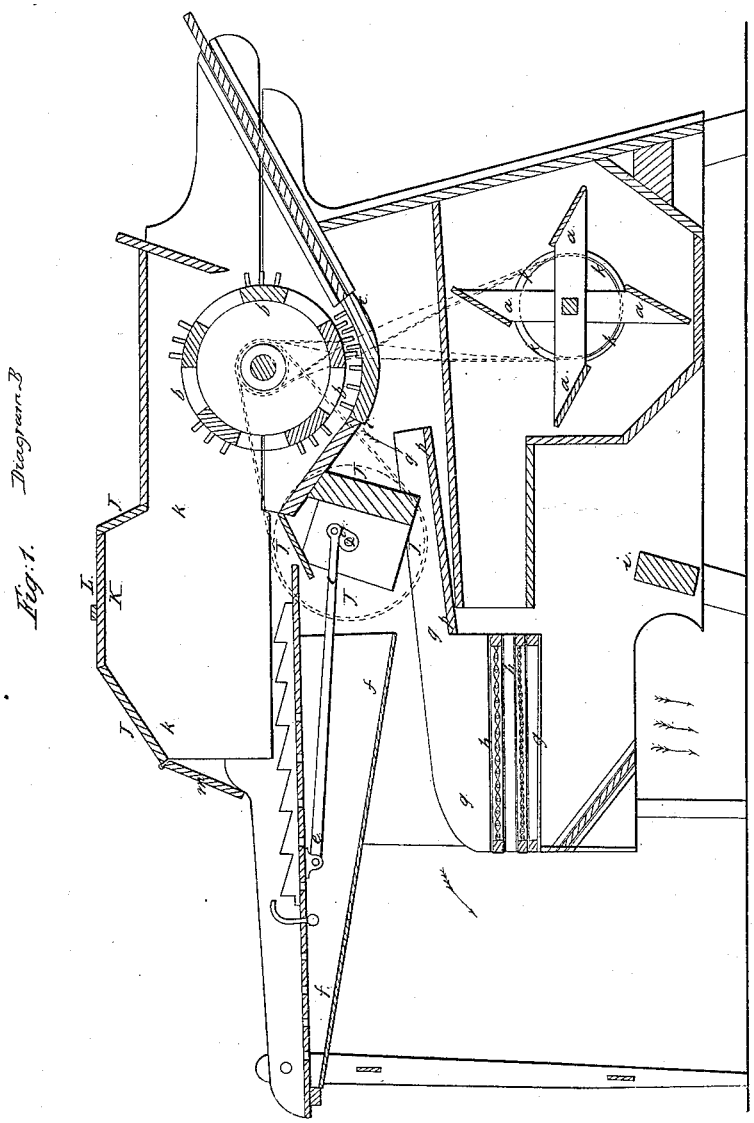

UNITED STATES PATENT OFFICE.

G. F. S. ZIMMERMAN, OF CHARLESTOWN, VIRGINIA.

WINNOWER AND THRESHER.

Specification of Letters Patent No. 9,579, dated February 8, 1853.

*To all whom it may concern:*

Be it known that I, GEO. F. S. ZIMMERMAN, of Charlestown, in the county of Jefferson and State of Virginia, have invented and made certain new and useful Improvements on Machines for Threshing and Cleaning Grain of All Kinds; and I do hereby declare that the following is a full, clear, and exact description of the method of construction and mode of operating the same, reference being had to the accompanying drawings, and making a part of this specification, in which—

Figure 1, Diagram A, is a geometrical perspective view of the machine complete, showing the mouth or feed place $a$, $a$, the propelling or band pulley $b$, $b$, the pitman, or shaker rod $c$, $c$, and the crank $p$, $p$, the shaking joint, or elbow connection $e$, $e$, the shoe or shaker $d$, $d$, the grain outlet, or delivery spout $f$, $f$; $g$, the valve or slide door to spout; $h$, $h$, $h$, $o$, $o$, the sides and bottom of the vibrating table, or straw deliverer; $i$, $i$, $i$, $i$, the straw-pusher; J, J, K, K, K, L, L, L, top, and sides of cap; $m$, $m$, the hinged flap to cap J, J, L, L, L, to prevent the straw from scattering; $g$, $g$, $g$, straps suspending the vibrating table on straw deliverer; $s$, $s$, $s$, shows sloping, scoop-like bottom to the vibrating table; $r$, $r$, connecting rod; $z$, the crank-joint attached to the shaft or axle of shaking rake, or straw beater; $v$, $v$, axle of shaking-rake; $q$, $q$, $q$, $q$, $q$, curved prongs on the beaters, to shaking rake.

Fig. 1, Diagram B, is a geometrical longitudinal section of elevation of the machine; $a$, $a$, $a$, $a$, the fan and arms; $b$, $b$, $b$, the threshing or spike cylinder and the concave $c$, $c$; $d$, the crank, connecting the rod $e$, $e$, with the vibrating table, or straw-deliverer; $f$, $f$, the sloping bottom, or grain receiver of the vibrating table; $g$, $g$, $g$, shoe or riddle shaker; $h$, $h$, the riddles; $i$, the grain outlet, or delivery spout; $j$, $j$, $j$, $j$, the straw-shaker pulley; $k$, $k$, $k$, the fan pulley.

To enable others to be skilled in the use and application of my invention and improvements, I will proceed to describe the construction and operation thereof, the nature and principles of which, consist in using a frame work, or case, ranging in form, construction and arrangement, from the cases, in general use. In my machine, the cap-piece, J, J, K, K, L, L, is changed in position, and instead of being arranged immediately over the spike cylinder or threshing drum at 4, this cap-piece is brought backward of the drum nearly perpendicular to the shoe or shaker, and instead of this cap being a cylindrical concave, it is more of a polygon, concave, and by giving more than the usual elevation to this cap-piece, J, K, L, Diagram A, the threshed straw escapes more freely; thus preventing the choking of the spike cylinder or threshing drum.

Again, another most essential advantage in my improved thresher, is presented, in constructing the straw deliverer, or vibrating table, after a new and original manner as follows: I have side pieces $h$, $h$, $h$, Diagram A, to which side pieces is attached a table or straw-platform $o$, $o$, having several sawlike, parallel strips $i$, $i$, $i$, $i$, attached thereto at proper distances as shown in Diagram A. The platform or straw-table, $o$, $o$, has a number of perforations or holes at proper intervals, answering and acting as a riddle, or screen, as shown by 2, 2, 2, 3, 3, 4, 4, 5, 5, 6, 7, 8, 9, 10, Diagram A. To this vibrating table or straw platform is attached a sloping, scoop-like bottom (of metal or other material), the slope, running inward, toward the center of the case, as represented at $s$, $s$, $s$, Diagram A. This vibrating table or straw-platform being complete, is termed a reciprocating shaker, or straw deliverer, and is appended to, or swung by straps or other means as shown at $g$, $g$, $g$, Diagram A. To the outward end of this vibrating table is attached a frame work, or standard support H, H, H, H, Diagram A, and this support works on a bolt joint $l$, $l$, Diagram A, thus admitting of a free movement backward and forward. The motion of this vibrating table is produced by a rod or pitman, $e$, $e$, fixed to a crank $d$, and axle $z$, attached to the band pulley J, J, J, J, as shown in Diagram B, Fig. 1, this connecting rod or pitman arranged and working under and between the perforated bottom, and the sloping bottom of vibrating table, as represented in Diagram B.

Passing up, through several of the holes or perforations, at proper intervals, in the vibrating table or straw-platform, are curved prongs, $q$, $q$, $q$, $q$, attached to a horizontally arranged rod, or axle, working underneath the perforated platform, as shown at $v$, $v$, Diagram A, and to which rod, is attached an oscillating joint or crank piece $z$, Diagram A. To this crank piece is attached a connecting rod $r, r$, working on a bolt, or screw $y$, with an eye $w$, and attached to the outside of the casing of the machine, all of which are represented in Diagram A. The saw-like strips $i, i, i, i$, Diagram A, are used for the purpose of pushing the straw forward in its passage from between the concave, and drum $b, b, b, c, c$, Diagram B, and to prevent the lodgment of the straw, and thereby dispensing with the revolving aprons or straw carriers, as are generally required, and used in threshing machines. The curved oscillating prongs, as shown at $q, q, q, q$, Diagram A, are used to beat the straw, and to shake out what grain or kernels are not separated by the spikes or the thresher, and thus preventing the kernels from passing off with the straw, and instead, the kernels thus beaten out or loosened, fall through the holes in the straw platform, and drop down, onto the sloping bottom or grain receiver $s, s, s$, Diagram A, and pass thence into the riddles, or screens, and are thus saved from being lost.

Another improved feature and principle in the operation of my threshing machine is the constructing of a shoe or shaker, with a sloping bottom, this slope tending entirely across from one side to the other of the shoe, by which means the grain passes off from the side of the shoe, out into the delivery spout, or grain outlet, and is deposited into a bag, that may be attached to the spout, thereby dispensing with manual power in the bagging of the grain. Again, too, I arrange the fan, or draft wheel almost immediately under the threshing drum, and spike-cylinder, connecting the fan to the shoe, by a shaking, or reciprocating connecting rod, curved or bent toward the fan-end of rod in the form represented at $c, x$, Diagram A. By this arrangement and connecting of the fan and shoe the draft or current of air acts or blows somewhat obliquely upward against the falling grain in its passage into the riddles, by which the chaffing and cleaning of the grain is more readily performed, with less power, and more expeditiously.

The whole operation of the machine is produced by any motive power applied, communicating the same by bands, pulleys or other means, attached to the sides of the machine.

By the aid of my improvements, the threshing of the grain, the separating of the straw and kernel, the winnowing, chaffing, cleaning and the bagging of the grain, are all accomplished in one operation, at the same time, and in a most effectual, economical, and expeditious manner. And by the aid of my said improvements one third more grain can be threshed, cleaned, and bagged, than by any other machine ever used, all of which have been fully tested, and practically demonstrated within the past year by actual experiment.

The sheaf of grain is fed into the machine at its mouth $a, a$, Diagram A, is drawn into the threshing cylinder and concave $b, b, b, c, c$, Diagram B, there threshed, the straw passing off into the cap, or chamber J, J, K, K, L, L, out onto the carriers, or straw deliverers $i, i, i, i$, and vibrating table $o, o$, Diagram A, and thence falling off in the direction of ← onto the ground or other receptacle. The separated grain, detached from the straw, falls from the drum or thresher onto the inclined platform $p, p$, Diagram B, down in the direction as represented by $g$ ↓ , $c$, thence into the riddles and screens $h, h$, and thence delivered or emptied out of the shoe at $i$, Diagram B. The chaff, passing off from out of the shoe in the direction of ← , Diagram B, and the tailings or screenings falling down underneath the shoe, at ↓ , ↓ , ↓ , Diagram B.

Having thus fully decribed the construction, operation, and advantages of my improved threshing and cleaning machine, what I claim as new, useful, and original with myself and desire to secure by Letters Patent of the United States, is as follows, viz:

I claim the invention, use, and application of the perforated vibrating-table $h, h, h, o, o$, arranged to a sloping bottom or platform $s, s, s$, and the parallel saw-like strips, or straw pushers $i, i, i, i$, combined with an oscillating rake $y, y, z$ and straw beaters, or curved prongs $q, q, q$, the whole combined, and working with the oscillating, hinged standard $l, l, y, x, x$, and suspending straps $g, g$, as shown in Diagram A, and substantially as set forth.

I do not, however, claim the invention of a combined threshing, separating, and winnowing machine; but only such parts as are set forth in my specification.

GEO. F. S. ZIMMERMAN.

Witnesses:
 S. C. CORDELL,
 F. M. EICHELBERGER.